(12) United States Patent
Huang

(10) Patent No.: US 7,254,893 B1
(45) Date of Patent: Aug. 14, 2007

(54) BLADE QUICK REMOVAL DEVICE FOR A HANDSAW

(76) Inventor: Yin-Hai Huang, P.O. Box 697, Fongyuan City, Taichung County (TW) 420

( * ) Notice: Subject to any disclaimer, the term of this patent is extended or adjusted under 35 U.S.C. 154(b) by 0 days.

(21) Appl. No.: 11/378,429

(22) Filed: Mar. 20, 2006

(51) Int. Cl.
*B23D 51/03* (2006.01)
(52) U.S. Cl. .............................. 30/512; 30/507; 30/517
(58) Field of Classification Search ................. 30/506, 30/507, 512, 513, 514, 519, 517
See application file for complete search history.

(56) References Cited

U.S. PATENT DOCUMENTS

| | | | | |
|---|---|---|---|---|
| 4,466,471 A | * | 8/1984 | Thomson | ...................... 30/517 |
| 6,606,795 B2 | * | 8/2003 | Erisoty et al. | ................. 30/512 |
| 6,772,522 B1 | * | 8/2004 | Huang et al. | .................. 30/513 |
| 7,007,394 B2 | * | 3/2006 | Erisoty et al. | ................. 30/512 |
| 2003/0056377 A1 | * | 3/2003 | Huang | .......................... 30/513 |

* cited by examiner

*Primary Examiner*—Hwei-Siu C. Payer

(57) ABSTRACT

A blade quick removal device includes an arcuate frame integrated with a front handle and a rear handle, a first hook bar under the front handle, an oscillatory second hook bar nearby the rear handle for adjustably retaining the saw blade thereon and a locking member pivoted to the lower end of the second hook bar for fastening the hook bar to a reduced bottom of the rear handle and having an axial rod and a pair of latches respectively held by a hook and a pair of retaining projections on the bottom of the rear handle.

3 Claims, 7 Drawing Sheets

2 - 2

2'-2'

BLADE QUICK REMOVAL DEVICE FOR A HANDSAW

BACKGROUND OF THE INVENTION

The present invention relates to hand tools and more particularly to a blade quick removal device for a handsaw which is structurally simple and stable.

As we know that there are various blade quick removal or quick assembly handsaws available in the market. But it gives the users not much convenience due to their structural complication.

SUMMARY OF THE PRESENT INVENTION

The present invention has a main object to provide a blade quick removal device for a handsaw which has an oscillatory rear hook bar for adjusting the distance between the retaining pins of the front and rear hook bars to facilitate a quick assembly or removal of the saw blade.

Another object of the present invention is to provide a blade quick removal device for a handsaw which has a rear locking member to reduce operational friction, to give an easy and stable fastening of the saw blade and to have a low rate of breakdown.

Accordingly, the blade quick removal device of the present invention comprises generally an arcuate frame, a pair of front and rear handles, a pair of front and rear hook bars and a looking member.

The feature is that the rear hook bar is of oscillatory to adjust the distance between a front and a rear retaining pin so as to facilitate a ready assembly or disassembly of the saw blade. The locking member is functioned to operate the rear hook bar and locks the rear hook bar on the rear handle stably and reliably.

The present invention will become more fully understood by reference to the following detailed description thereof when read in conjunction with the attached drawings.

DETAILED DESCRIPTION OF THE PREFERRED EMBODIMENT

Figure 1:
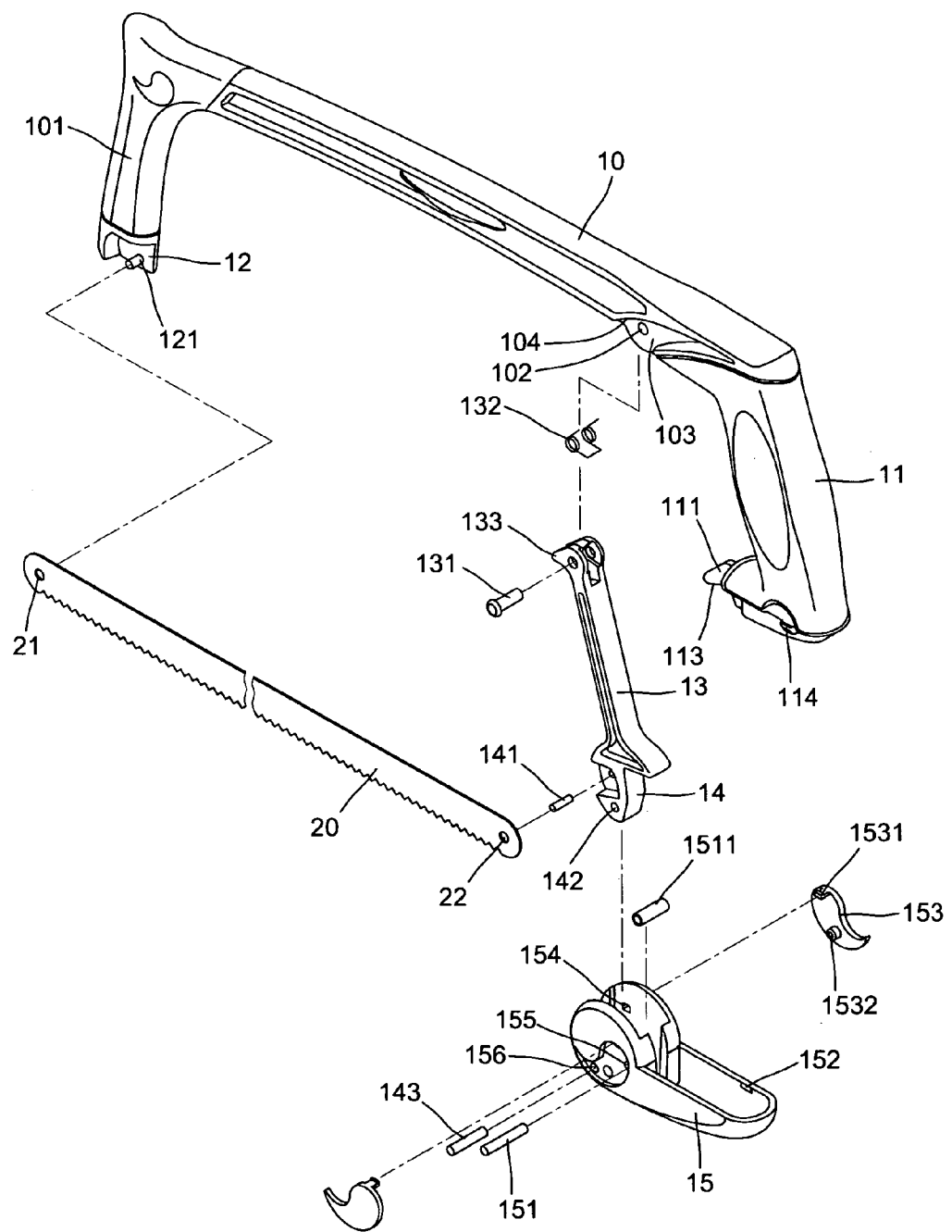
FIG. 1 is an exploded perspective view of the preferred embodiment of the present invention.
Figure 2:
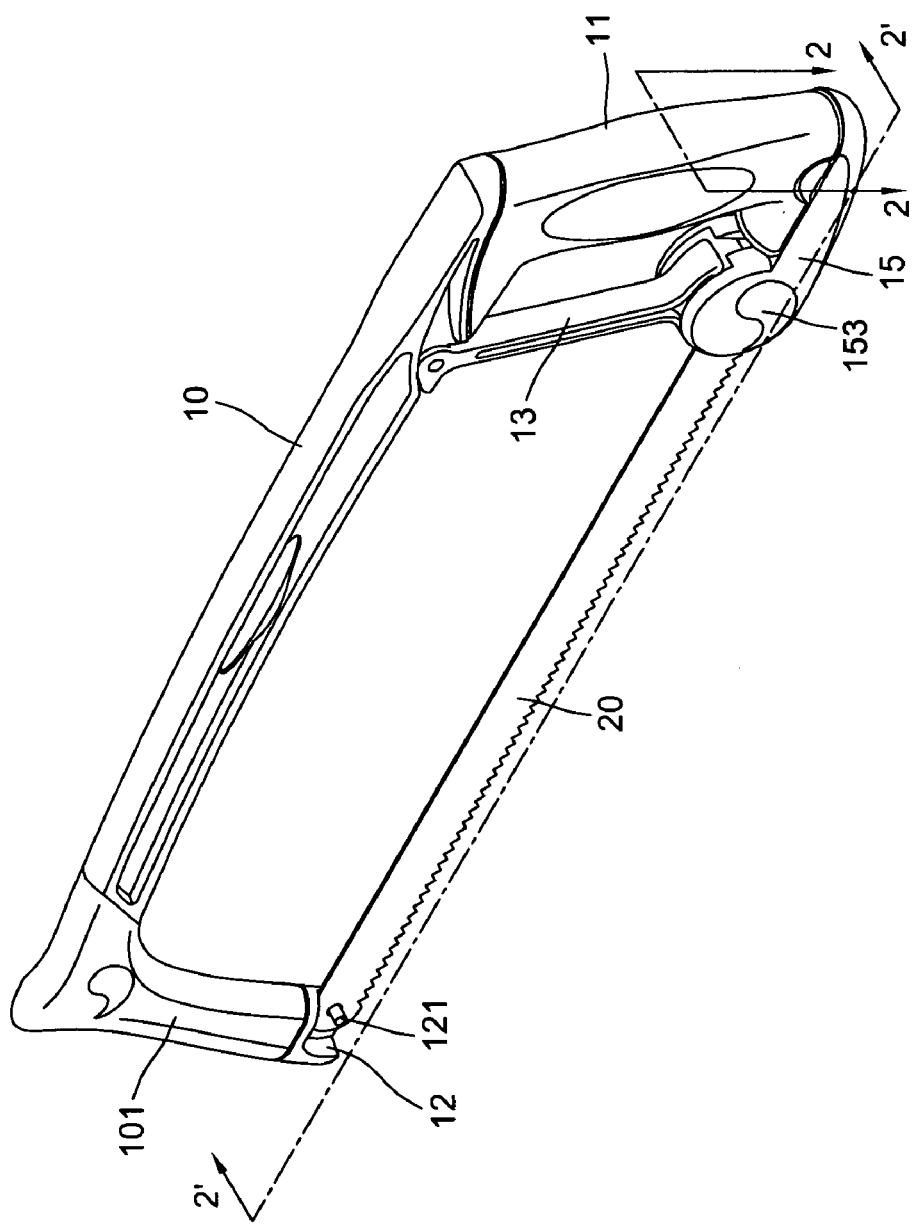
FIG. 2 is a perspective view to show the assembly of FIG. 1.
Figure 3:
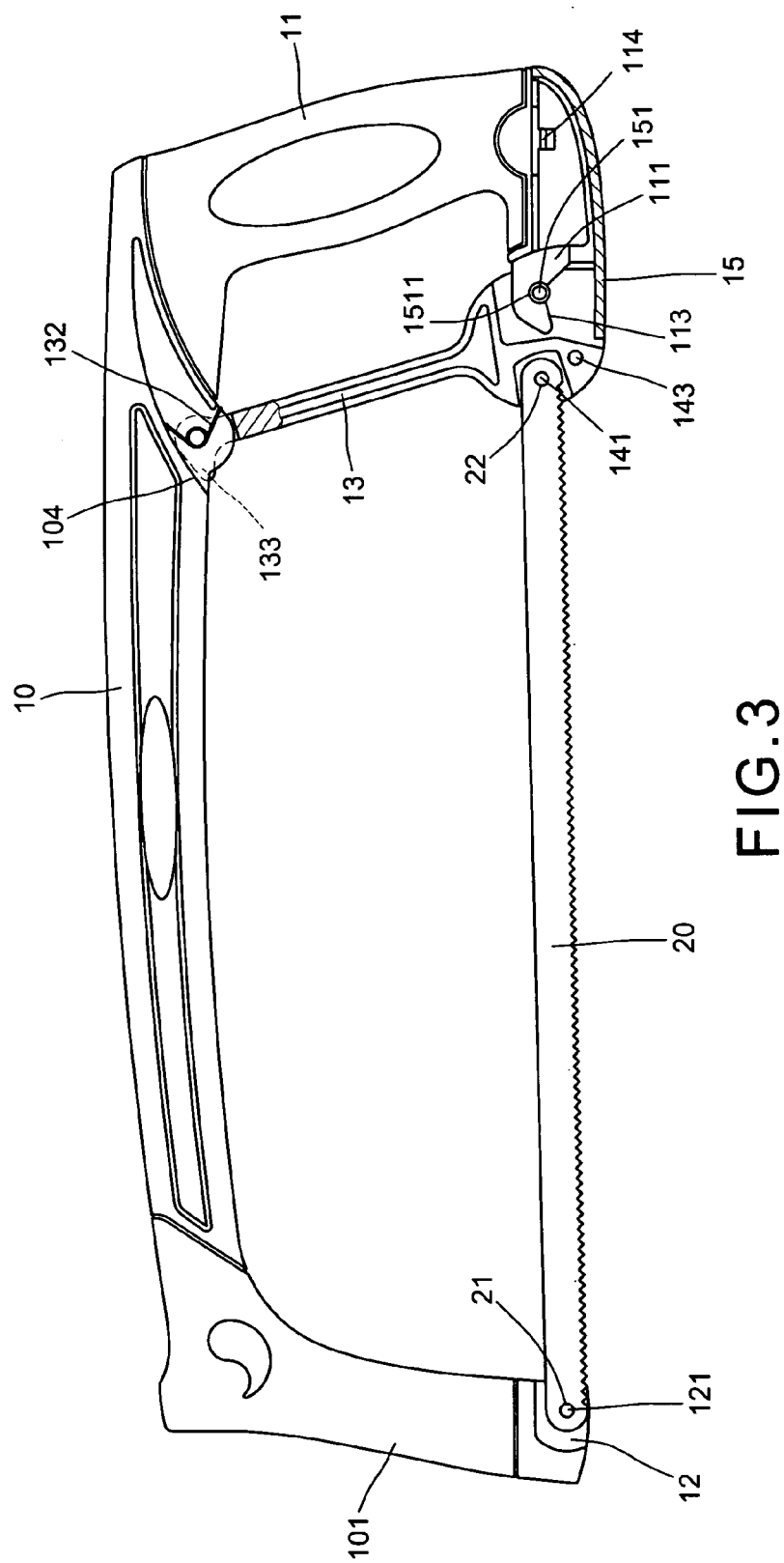
FIG. 3 is a plane view with partially sectional view of FIG. 2.
Figure 4:
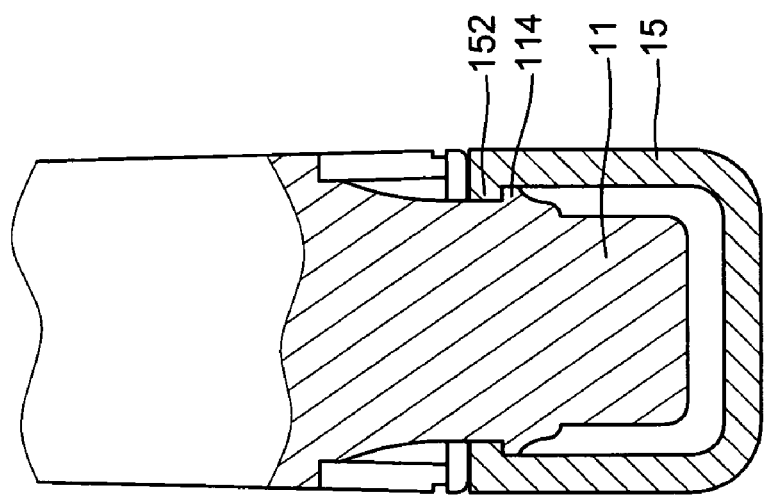
FIG. 4 is a section taken along line 2-2 of FIG. 2.
Figure 5:
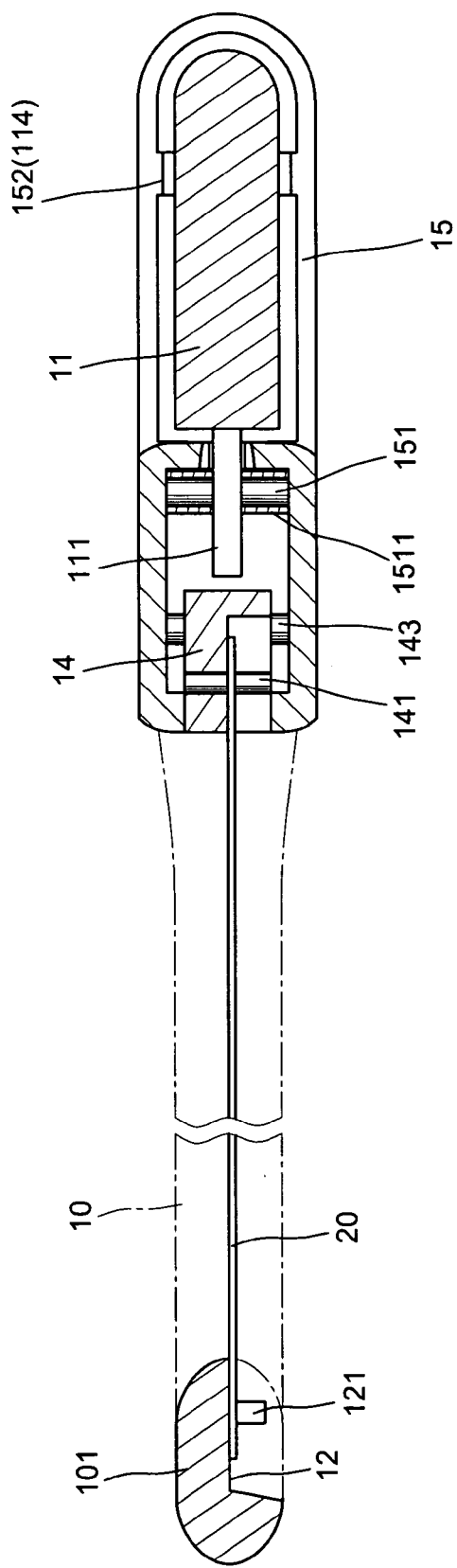
FIG. 5 is a section taken along line 2'-2' of FIG. 2.

With reference to the drawings and initiated from FIGS. 1-5, the blade quick removal device for a handsaw of the present invention comprises an arcuate frame 10 which is integrated with a front handle 101 and a rear handle 11 and has a double concaves to define a roughly triangular flat portion 103 therebetween, a pair of stop walls 104 and a through hole 102 near the front end of the flat portion 103. The front handle 101 has at lower end a front hook bar 12 having a depression in a lateral side and a retaining pin 121 on an inner side of the depression. Meanwhile, the rear handle 11 has a reduced lower end including a hook 111 with a guiding surface 113 and a retaining slot 112 on the front side and a pair of retaining projections 114 symmetrically projected on two lateral sides. A rear hook bar 13 has a pair of roughly triangular upper ends 133 spacedly formed and engaged with the flat portion 103 of the frame 10 each having an aligned through hole engaged with the through hole 102 of the narrow portion 103 and pivotally secured by a rivet 131 with a double-coil spring 132 positioned therebetween and a round reduced lower end 14 which has a depression in a lateral side for anchoring a retaining pin 141 and a through hole 142 in a thick portion. So that the rear hook bar 13 is oscillatory on the rivet 131 and biased by the spring 132. The spring 132 provides rearward resilience to force the lower end 14 of the rear hook bar 13 to oscillate foreword and the upper ends 133 are slidably stopped against the stop walls 104. A locking member 15 has a pair of symmetrically formed circular front ends and a shallow dishpan type rear end which has a U-shaped side wall including a pair of latches 152 symmetrically formed on opposing inner sides of the side wall made engageable with the pair of the retaining projections 114 of the rear handle 11. The pair of circular front ends each has a crescent depression in outer surface for respectively securing a pair of crescent reinforcement plates 153 each of which has a protrusion piece 1531 respectively pressed into the inlaid holes 154 and a tubular axle bush 1532 respectively pressed into the circular holes 155 of the crescent depressions for anchoring therebetween an axial rod 151 which has a rolling tube 1511 wrapped on in the purpose of reduction of the frictions within the slot 102 of the hook 111. An aligned through hole 156 in a angled narrow portion of the crescent depressions engaged with the through hole 142 and pivotally secured by an axial pin 143 for movably suspending the locking member 15 from the reduced lower end 14 of the rear hook bar 13. A saw blade 20 has an eye 21 and 22 in each end engageable with the retaining pins 121 and 141.

Figure 6:
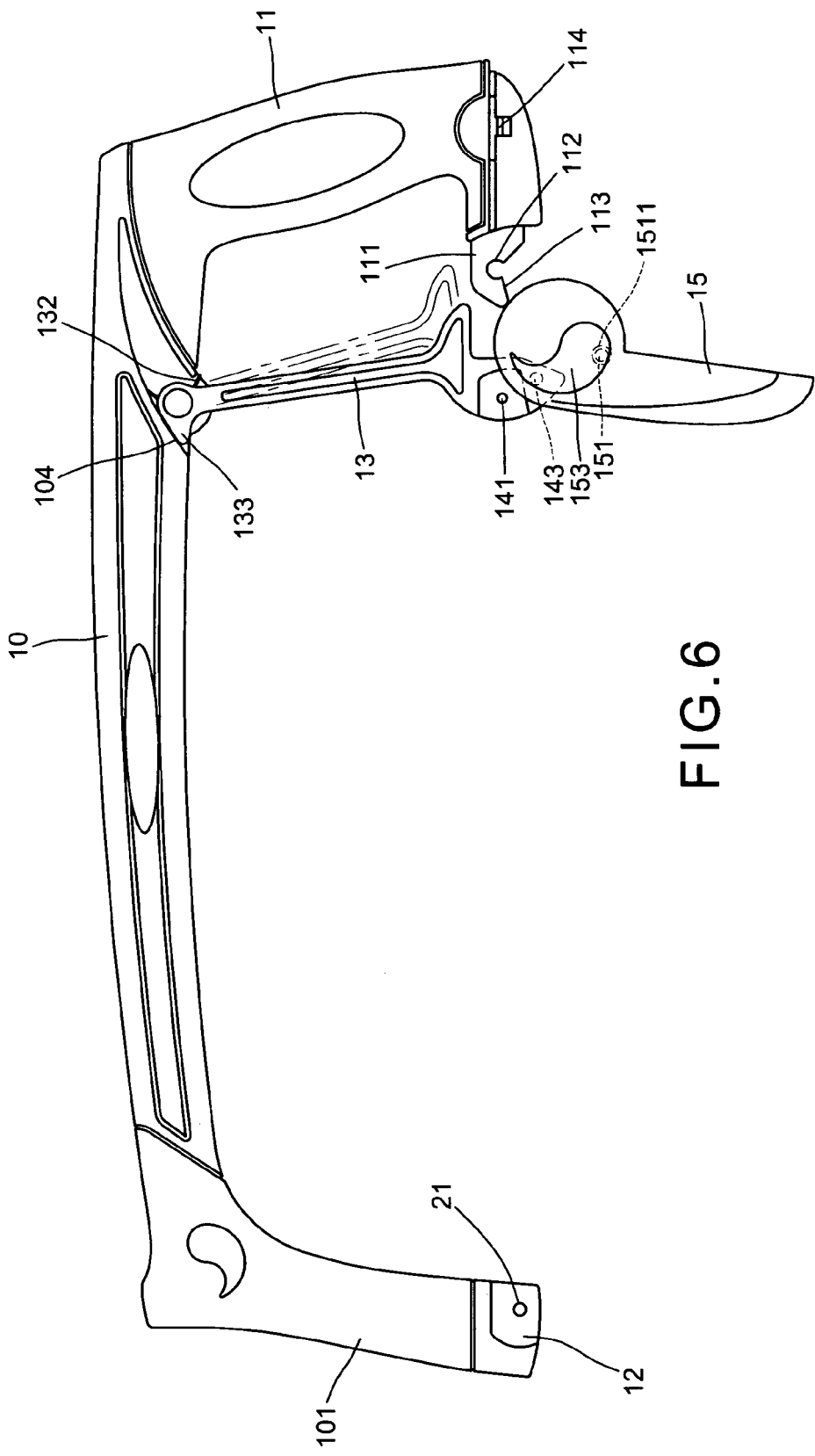
FIG. 6 is a plane view to show an unfastened locking member.
Figure 7:
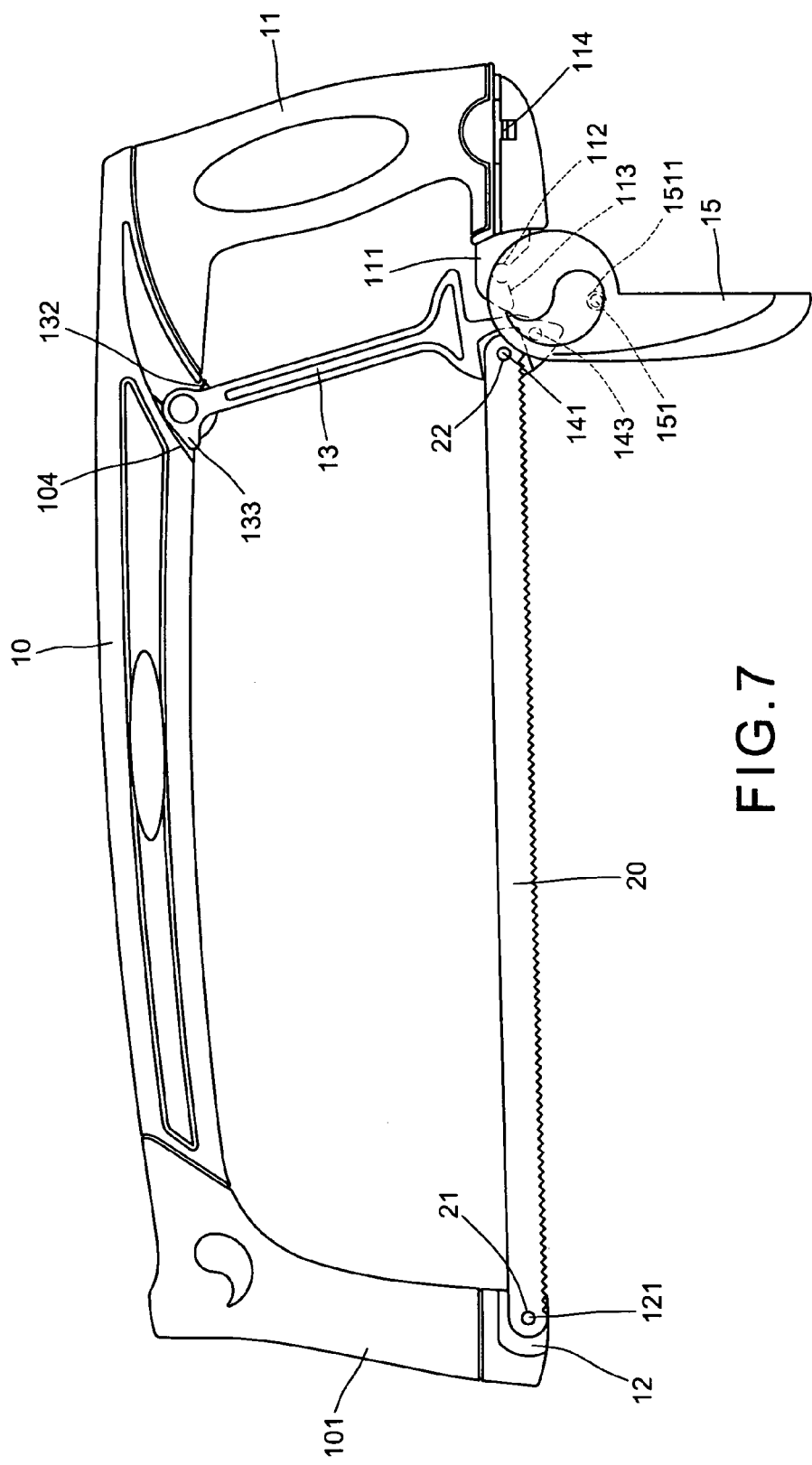
FIG. 7 is a plane view to show the fastening locking member.

Upon the above structure arrangement, when assemble the saw blade 20 onto the handsaw, first pull the rear portion of the locking member 15 downward to have its latches 152 unfastened with the retaining projections 114, simultaneously, the axial rod 151 is rolling out of the slot 112. So that the locking member 15 becomes suspended from the reduced lower end 14 of the rear hook bar 13 (as shown in FIG. 6). Meanwhile, the rear hook bar enables to oscillate a slight foreword due to the resilience of the spring 132 and is limited by the stopping walls 104. This arrangement aims to give a certain elasticity to receive the saw blade 20 on the retaining pins 121 and 141. After the eyes 21 and 22 of the saw blade 20 are respectively engaged with the retaining pins 121 and 141, apply the locking member clockwise to have the latches 152 fastened to the retaining projections again in a snap fitting and the axial rod 151 sliding back to the slot 112 again. Simultaneously, the rear hook bar 13 pulled by the locking member 15 oscillates rearward. So that the saw blade is already assembled onto the handsaw in a predetermined tension (as shown in FIG. 7). The assembly of the saw blade 20 should be very simple and stable due to the oscillation of the rear hook bar 13 that gives a certain elasticity to adjust the positions of the retaining pins 121 and 141 in order to consist with the distance between the two eyes 21 and 22. If disassemble the saw blade 20 from the handsaw, do the process as discussion in FIG. 6 again.

Conclusively, the blade quick removal device of the present invention provides a structure simplification and stability that enables the user to readily assemble or disassemble saw blade 20 from the handsaw without any difficulties.

Note that the specification relating to the above embodiment should be construed as an exemplary rather than as a limitative of the present invention, with many variations and modifications being readily attainable by a person of average skill in the art without departing from the spirit or scope thereof as defined by the appended claims and their legal equivalents.

I claim:

1. A handsaw comprising:
   an arcuate frame which integrates with a front handle and a rear handle and has a pair of concaves in opposing lateral sides thereof to define a triangular flat portion therebetween, a pair of stop walls and a first through hole in said flat portion, a first hook bar under said front handle and having a depression in one lateral side thereof for disposing a first retaining pin, a reduced portion at a lower end of the rear handle including at the front side thereof a hook which has a guiding surface and a retaining slot in the underside thereof, a pair of retaining projections symmetrically formed on opposing lateral sides of said rear handle;
   a second hook bar having a pair of triangular upper ends each having an aligned hole engaged with the through hole spacedly formed and engaged with the flat portion of said frame and pivotally secured by a rivet with a double-coil spring biased therebetween and a round reduced lower end having a depression in a lateral side thereof for anchoring a second retaining pin and a second through hole in a thick portion;
   a locking member having a pair of circular front ends symmetrically formed each including a crescent depression in its outer surface and each of which has an inlaid hole, a circular hole, a third through hole and a central through hole, and a shallow dishpan type rear end which has a U-shaped side wall and a pair of latches on an inner side of opposing side walls made engaged with said retaining projections of the rear handle in a snap fitting, said third through holes being engaged with the second through hole of said second hook bar and pivotally secured by a retaining rod;
   a pair of reinforcement crescent plates engaged with said crescent depression respectively each having a protrusion piece respectively pressed into said inlaid holes and an axle bush respectively pressed into said circular holes;
   an axial rod having a rolling tube wrapped on anchored into said axle bushes at two ends;
   a saw blade having an eye in each end engageable with said first and second retaining pins respectively.

2. The handsaw as recited in claim 1, wherein said second hook bar is oscillatory to adjust the positions of said first and second retaining pins for consisting with the distance between the eyes of said saw blade.

3. The handsaw as recited in claim 1, wherein said axial rod is slidably retained by the retaining slot of said hook.

* * * * *